United States Patent [19]
McClelland

[11] Patent Number: 4,634,321
[45] Date of Patent: Jan. 6, 1987

[54] CHUCK KEY AND EXTENSION MEMBER FOR A CHUCK KEY

[76] Inventor: Thomas W. McClelland, 407 Broome St., 4th Floor, New York, N.Y. 10013

[21] Appl. No.: 755,608

[22] Filed: Jul. 16, 1985

[51] Int. Cl.⁴ .............................................. B23B 39/00
[52] U.S. Cl. .................................. 402/241 R; 81/16; 279/1 K
[58] Field of Search .................... 408/241 R; 279/1 K; 81/16; 16/2, 116 R; 24/16 PB, 115 H, 116 R

[56] References Cited

U.S. PATENT DOCUMENTS

| | | | |
|---|---|---|---|
| 1,347,740 | 7/1920 | Hack | 279/1 K |
| 1,370,598 | 3/1921 | Lapointe | 279/1 K X |
| 2,257,559 | 9/1941 | Albertson | 279/1 K |
| 2,263,277 | 11/1941 | Schumann | 81/16 |
| 2,713,407 | 7/1955 | Miller | 408/241 R X |
| 3,686,985 | 8/1972 | Ostrager | 279/1 K |
| 4,395,171 | 7/1983 | Rohm | 279/1 K X |
| 4,467,677 | 8/1984 | Grifford | 279/1 K X |
| 4,532,834 | 8/1985 | Hartman | 81/16 |
| 4,558,495 | 12/1985 | Olsen | 408/241 R X |

FOREIGN PATENT DOCUMENTS 3345996  3/1985  Fed. Rep. of Germany ... 408/241 R

Primary Examiner—Gil Weidenfeld
Assistant Examiner—Glenn L. Webb
Attorney, Agent, or Firm—Felfe & Lynch

[57] ABSTRACT

A chuck key which can be readily attached to a cable for suspending the same when not in use and which does not interfere with the rotation of the chuck key when it is in use. The chuck key has an extended rod portion on a side of a transverse rod opposite to the gear on the chuck key enabling an unencumbered turning of the key, preferably in relation to the means of suspension and the transverse rod. The extended portion has an aperture or socket therein near an end thereof for receiving a ball attached to a cable extending through a longitudinal aperture through the end of the extended portion.

11 Claims, 7 Drawing Figures

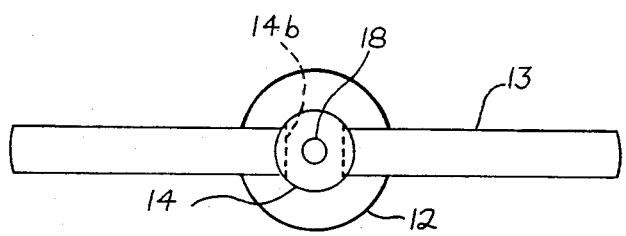
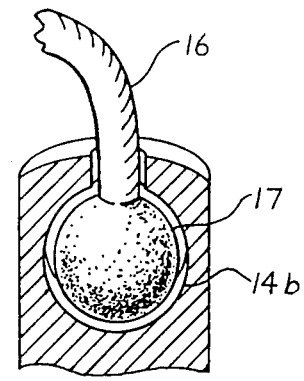
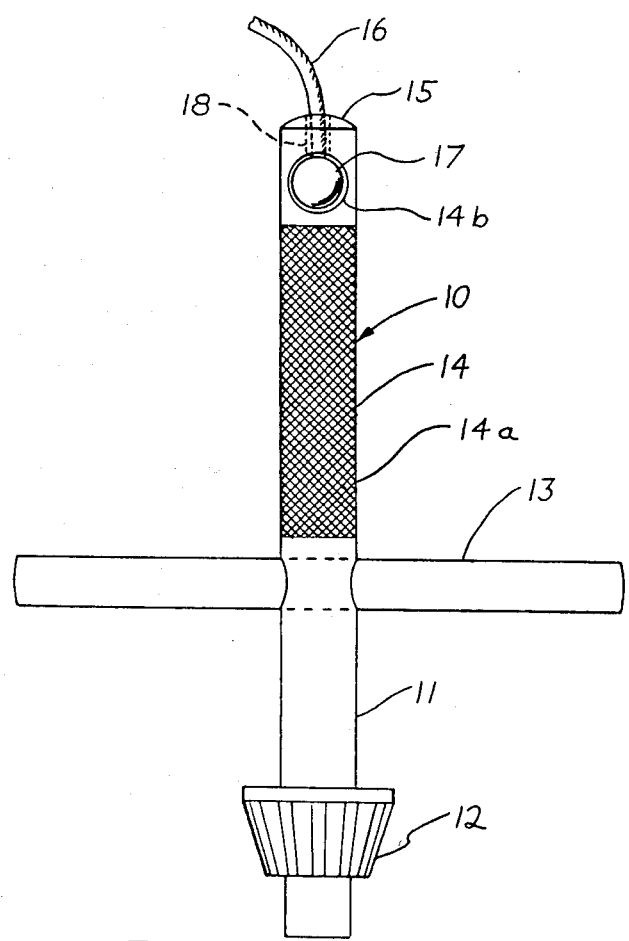
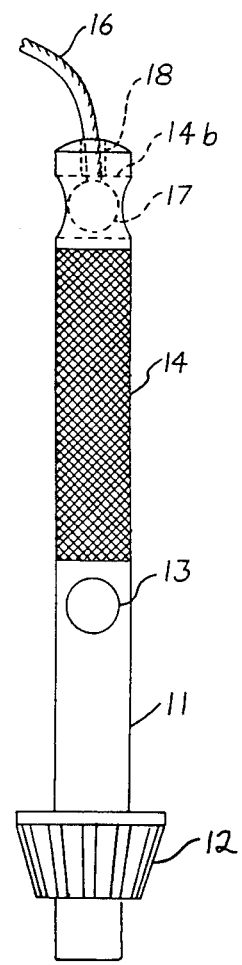
FIG. 3  FIG. 4
FIG. 1  FIG. 2

CHUCK KEY AND EXTENSION MEMBER FOR A CHUCK KEY

This invention relates to a chuck key and to an extension member for a chuck key. The invention also relates to the combination of a chuck key with a suspension therefor.

Heretofore, chuck keys for the well known Jacobs chuck have had a usual structure of a rotatable rod having a beveled gear near one end thereof and a transverse member extending through the rod for turning the same near the other end thereof. Such chuck keys are easily misplaced and lost.

U.S. Pat. No. 4,111,079-Derbyshire suggests a flexible leash wrapped on the chuck key so that it can be connected to a power tool or cable or suitable anchor point. Such a flexible leash has a limited life span and is cumbersome during use of the chuck key.

U.S Pat. No. 2,263,277-Shumann shows a device which allows a chuck key to be fastened to the power cord of an electric drill or other power tool. Although it allows the key to turn in a spool-like member, this holder is also cumbersome and not easily adaptable to the many situations involving chucks and chuck keys.

Both holders involve a harness system which surrounds the chuck key midway between the transverse rod and the gear end. This inhibits the user's ability to turn the key quickly when adjusting a chuck because the harness device is between the user's hand and the chuck itself.

It is an object of the present invention, therefore, to provide a new and improved chuck key which avoids one or more of the the above-mentioned disadvantages of prior such chuck keys.

It is another object of the invention to provide a new and improved chuck key which can be readily attached to a cable for suspending the same when not in use and which does not interfere with the rotation of the chuck key when it is in use.

It is another object of the invention to provide a new and improved extension member for a chuck key which can be utilized with existing chuck keys to render them more readily rotatable.

It is another object of the invention to provide a new and improved extension member for a chuck key which can be utilized with a cable for preventing loss of the chuck key and which does not interfere with the use of the chuck key.

In accordance with the invention, a chuck key comprises a rotatable rod having a gear thereon and transverse means extending therefrom for rotating said rod. The rod has an extended portion on a side of the transverse means opposite to the gear. The extended portion has an aperture therein near an end thereof.

Also in accordance with the invention, the combination comprising a chuck key including a rotatable rod having a gear thereon and transverse means extending therefrom for rotating the rod, the rod having an extended portion on a side of the transverse means opposite to the gear, the extended portion having an aperture therein near an end thereof, and a cable having a ball fitting in the aperture and extending through the extended portion near the end thereof.

Also in accordance with the invention, an extension member for a chuck key including a rotatable rod having a gear thereon and transverse means extending therefrom for rotating the rod, comprises means for releasably securing the extension member to the rod to extend from a side of the rod opposite to the gear, and a rod portion extending from the securing means.

Also in accordance with the invention, the combination comprises a chuck key and an extension member for a chuck key including a rotatable rod having a gear thereon and transverse means extending therefrom for rotating the rod comprising means for releasably securing the extension member to the rod to extend from a side of the rod opposite to the gear, a rod portion extending from the securing means, and a cable having a ball fitting in an aperture and extending through the extension member.

For a better understanding of the present invention, together with other and further objects thereof, reference is made to the following description, taken in connection with the accompanying drawings, and its scope will be pointed out in the appended claims.

Referring now to the drawings:

FIG. 1 is an elevational view of a chuck key constructed in accordance with the invention;

FIG. 2 is a side elevational view of a chuck key constructed in accordance with the invention;

FIG. 3 is a plan view of a chuck key constructed in accordance with the invention; and FIG. 4 is a fragmentary, sectional view, to an enlarged scale, of a chuck key and cable constructed in accordance with the invention;

Figure 7:
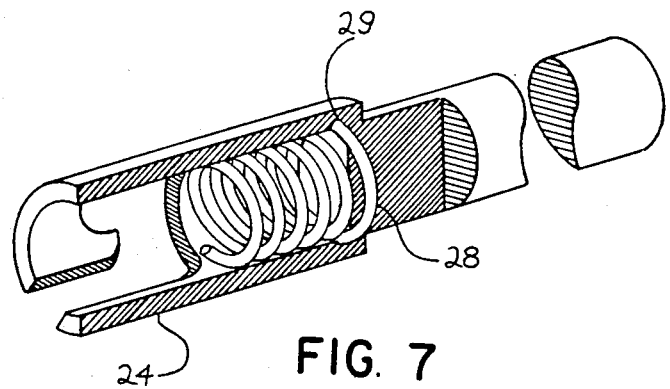
FIG. 7 is a fragmentary, sectional view, to an enlarged scale, of an extension member constructed in accordance with the invention.

Referring now more particularly to FIGS. 1-4 of the drawings, a chuck key 10 comprises a rotatable rod 11 having a gear 12 thereon and transverse means 13 extending therefrom for rotating the rod 11. The transverse means 13 may be, for example, a transverse rod affixed to the rod 12 or a transverse rod slidable therethrough. The rod 11 has an extended portion 14 on a side of the transverse means 13 opposite to the gear 12. The extended portion 14 has an aperture 14b therein near an end 15 thereof. The extended portion 14 has a knurled surface portion 14a for facilitating rapid manual finger rotation of the rod and a rapid change in chuck opening. The extended portion 14 preferably is of sufficient length to enable an unencumbered turning of the chuck key in relation to the means of suspension and the transverse means 13. For example, the extended portion may be at least as long as the length of the portion of the rod 11 between the transverse means 13 and the end of the rod 11 adjacent the gear 12. The combination of a chuck key and elongated flexible means preferably comprises a cable 16 having a ball 17 fitting in the transversely extending aperture 14b and extending through a top longitudinally extending or axial aperture 18 in the extended portion 14. The cable 16 may be of wire and have a loop (not shown) at the end thereof for hanging the cable with the chuck key attached thereto when not in use.

When rotating the chuck key, the key rotates freely around the ball 17 and the cable 16 so that there is no impairment of the use thereof. If desired, the cable can be removed from the aperture 14b and the opening 15 and the aperture 14b can be used for hanging the chuck key on a suitable hook.

Figure 6:
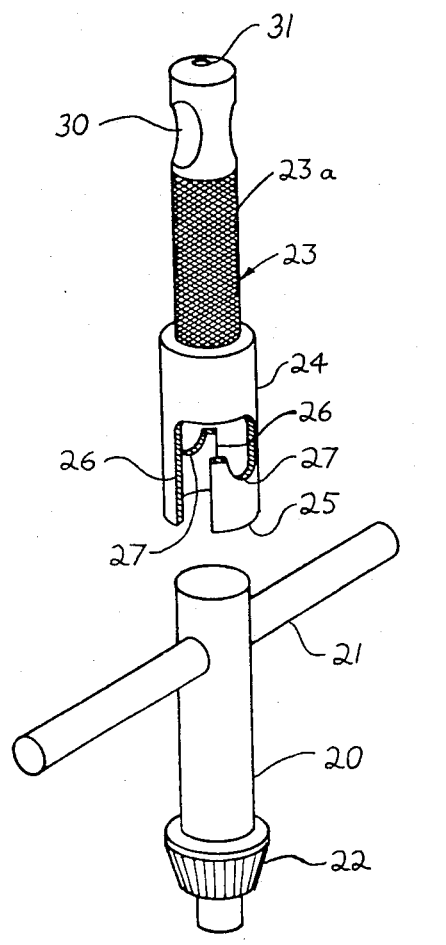
FIG. 6 is an exploded, perspective view of the combination of FIG. 5.
Figure 5:
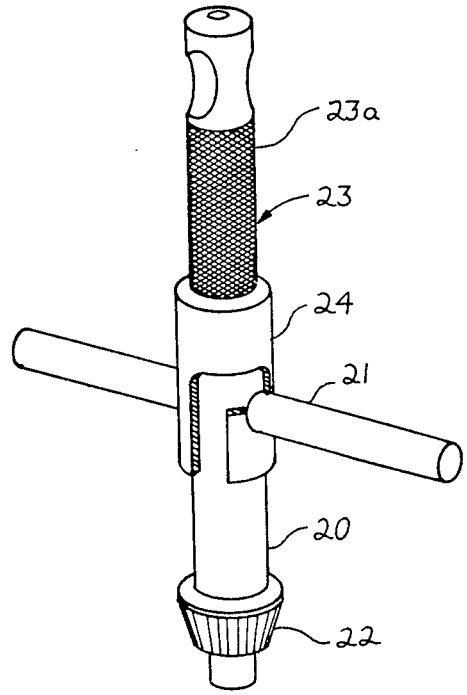
FIG. 5 is a perspective view of the combination of an extension member for a chuck key and a chuck key constructed in accordance with the invention.

Referring now more particularly to FIGS. 5, 6 and 7, there is represented the combination of a chuck key and extension member for a chuck key including a rotatable rod having a gear thereon and transverse means extending therefrom for rotating the rod. More particularly, a chuck key 20 of conventional construction as represented in FIG. 6 has transverse means 21 and a gear 22 thereon. An extension member 23 for the chuck key comprises means 24 for releasably securing the extension member 23 to the rod 20 to extend from a side of the rod 20 opposite to the gear 22. The securing means preferably comprises a hollow, substantially cylindrical member 25 having slots 26 therein for fitting over the transverse means 21 with the cylinder 24 rotatable on the rod 20 to lock the transverse means 21 in the groove 27.

As represented in FIG. 7, the cylinder 24 houses a spring 28 which is seated in a circumferential groove 29 and urges the rod 20 downwardly as viewed in FIG. 5 to lock the transverse means 21 in the groove 27. When rotating the chuck key by twisting the extension member 23 between the fingertips, there is no encumbrance between the hand and the transverse means enabling a rapid rotation of the chuck key and a rapid change in chuck opening. The extension member 23 preferably has a rod portion 23a extending from the securing means 24 and which preferably is of sufficient length to enable an unencumbered turning of the chuck key in relation to the means of suspension and the transverse means 21. For example, the rod portion 23a may be at least as long as the length of the portion of the rod 20 between the transverse means 21 and the end of the rod 20 adjacent the gear 22.

A ball and cable (not shown) similar to the ball 17 and cable 16 of the FIG. 1 embodiment may be utilized in the same manner as in the FIG. 1 embodiment and with the ball in the transversely extending aperture 30 and the cable extending through the longitudinally extending or axial aperture 31.

While there have been what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. The combination of a chuck key and a suspension therefor comprising:
    a rotatable rod having a gear thereon and transverse means extending therefrom for rotating said rod, said rod having an extended portion on a side of said transverse means opposite to said gear, said extended portion having an aperture therein near an end-portion thereof and extending transversely through said extended portion;
    said extended portion having an aperture extending longitudinally through said end portion to said transversely extending aperture; and
    elongated, flexible means having a ball fitting in said transversely extending aperture and said flexible means extending through said longitudinally extending aperture through said end portion.

2. An extension member for a chuck key including a rotatable rod having a gear thereon and transverse means extending therefrom for rotating the rod, the extension member being suitable for use with flexible means having a ball fitting in a transversely extending aperture of the extension member and with the flexible means extending through a longitudinally extending aperture of the extension member, the extension member comprising:
    means for releasably securing the extension member to the rod to extend from a side of the rod opposite to the gear; and
    a rod portion extending from said securing means, said rod portion having an aperture therein near an end portion thereof and extending transversely through said rod portion, and said rod portion having an aperture extending longitudinally through said end portion to said transversely extending aperture.

3. An extension member in accordance with claim 2, in which said rod portion extending from said securing means is of sufficient length to enable an unencumbered turning in relation to the transverse means.

4. An extension member in accordance with claim 2, in which the extension member has a knurled surface portion.

5. An extension member in accordance with claim 2, in which said securing means comprises a hollow portion slidably mountable over the rod portion for interlocking with said transverse means.

6. An extension member in accordance with claim 5, in which said securing means comprises a spring within said hollow portion.

7. The combination comprising:
    a chuck key including a rotatable rod having a gear thereon and transverse means extending therefrom for rotating the rod;
    an extension member for the chuck key, the extension member comprising means for releasably securing the extension member to the rod to extend from a side of the rod opposite to the gear, a rod portion extending from said securing means and said rod portion having an aperture therein near an end portion thereof and extending transversely through said rod portion, and said rod portion having an aperture extending longitudinally through said end portion to said transversely extending aperture; and
    elongated, flexible means having a ball fitting in said transversely extending aperture and extending through said longitudinally extending aperture of said rod portion of the extension member.

8. The combination in accordance with claim 7, in which said rod portion extending from said securing means is of sufficient length to enable an unencumbered turning in relation to said transverse means.

9. A chuck key suitable for use with flexible means having a ball fitting in a transversely extending aperture of the chuck key and with flexible means extending through a longitudinally extending aperture of the chuck key comprising:
    a rotatable rod having a gear therein and transverse means extending therefrom for rotating said rod, said rod having an extended portion on a side of said transverse means opposite to said gear, said extended portion having an aperture therein near an end portion thereof and extending transversely through said extended portion, and said extended portion having an aperture extending longitudinally through said end portion to said transversely extending aperture.

10. A chuck key in accordance with claim 9, in which said extended portion is of sufficient length to enable an unencumbered turning in relation to said transverse means.

11. A chuck key in accordance with claim 9, in which said extended portion has a knurled surface portion.

* * * * *